(12) United States Patent
Ota

(10) Patent No.: US 6,201,571 B1
(45) Date of Patent: Mar. 13, 2001

(54) DIGITAL CAMERA RECORDING A REDUCED IMAGE SYNTHESIZED WITH A CHARACTER IMAGE OF THE IMAGE PICKING-UP INFORMATION

(75) Inventor: Takayuki Ota, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/874,855

(22) Filed: Jun. 13, 1997

(30) Foreign Application Priority Data

Jun. 13, 1996 (JP) .................................................. 8-152085

(51) Int. Cl.[7] ............................ H04N 5/262; H04N 5/225
(52) U.S. Cl. .................................... 348/239; 348/232
(58) Field of Search .................................... 348/207, 222, 348/231, 232, 239, 333, 334, 589, 552; H04N 5/225, 5/262

(56) References Cited

U.S. PATENT DOCUMENTS

| 5,796,429 | * | 8/1998 | Suzuki et al. | 348/232 |
| 5,806,072 | * | 9/1998 | Kuba et al. | 348/231 |
| 5,870,143 | * | 2/1999 | Suzuki | 348/333 |
| 6,020,920 | * | 2/2000 | Anderson | 348/231 |

FOREIGN PATENT DOCUMENTS

| 58-53276 | 3/1983 | (JP) . |
| 1-94772 | 4/1989 | (JP) . |
| 1-183282 | 7/1989 | (JP) . |
| 5-244482 | 9/1993 | (JP) . |
| 6-276478 | 9/1994 | (JP) . |
| 7-319901 | 12/1995 | (JP) . |
| 9-135412 | 5/1997 | (JP) . |

* cited by examiner

Primary Examiner—Tuan Ho
(74) Attorney, Agent, or Firm—Foley & Lardner

(57) ABSTRACT

A reduction processing section (10) performs a reduction processing for a picked-up image on frame memory (7). A character image generating section (30) converts contents of parameter table (6) and information concerning date, time and picking-up conditions to a character image and store it in a work memory (31). A synthesis processing section (32) synthesizes the character image on the work memory (31) with the reduced image from the reduction processing section (10). The synthesized simultaneous display reduced image (33) is stored together with an original image (14) and a compressed image (15). Thus, when simultaneous displaying is performed with a application software on a personal computer, an reduced image for use in simultaneous displaying, on which picking-up date, picking-up time and picking-up data are superimposed, is displayed, whereby processing speed for image data retrieval is increased. Moreover, an original image is stored as it is without modifying an initial image.

11 Claims, 8 Drawing Sheets

DIGITAL CAMERA RECORDING A REDUCED IMAGE SYNTHESIZED WITH A CHARACTER IMAGE OF THE IMAGE PICKING-UP INFORMATION

BACKGROUND OF THE INVENTION

1. Field of the Invention

The present invention relates to a digital camera, more particularly to a digital camera which is capable of converting an analog image to a digital image to store it as a static image on a recording medium, and an operator is capable of easily fetching the image to a host computer by connecting the recording medium to the host computer.

2. Description of the Related Art

In general, a digital camera is an input device which converts an analog signal output from a CCD (charged coupled device) to a digital signal and records a static image either in a memory in the camera or in an external recording medium such as a floppy disk and a PCMCIA card, which is a card type memory and a modem card according to standard set by Personal Computer Memory Card Association in United States of America and Japan Electronic Industry Developing Association (JEIDA).

In order to use an image picked up by an ordinary camera in a computer, an object is picked up by the camera. A negative or positive slide is prepared from a photo-graphic film, and an image on the negative or positive slide is printed on a photographic paper. The image on the negative or positive slide or the photographic paper having been printed is scanned by a scanner whereby the image is converted to a digital image. Or, a professional photo studio prepares a photo CD to convert the analog image to the digital image.

The above described treatment requires many steps until the picked-up image actually becomes available in the computer. Particularly, it brings about lack of promptness. For this reason, in a system where data is finally processed by the computer, a digital camera which has an ability to instantaneously form an input image supplied to the computer has been popularized. For example, concerning a news photograph made by a news paper publishing company in which promptness is very important, an image picked up by the digital camera is transmitted to a remote place using a network, thereby increasing its promptness.

Furthermore, instead of image picking-up by a Polaroid camera for damaged portions due to a car accident, the damaged portions are picked-up with a digital camera and the picked-up image can be transmitted to an automobile physical damage insurance company through a network. Furthermore, use of a digital camera has been begun as input means in various kinds of business fields such as confirmations for architecture state by an architectural firm, acquisition of information concerning objects to be dealt with by used car dealers which exchange information through computers, and data input by a realty dealer who performs guides for dealing objects by a computer.

An image written to a recording medium is generally transmitted to a host computer side through various kinds of interface cables, when the recording medium is installed in a camera so that it is impossible to freely detach it from the camera. Furthermore, in case of an external recording medium capable of being freely detached such as a floppy disk and a PCMCIA card, the external recording medium is detached from the camera and it is set to the host computer, whereby the picked-up image is transmitted to the host computer. At this time, when data concerning date and time simultaneously output is stored as a character image superimposed on an original image, the superimposed data is referenced at the time of image display. When the data concerning data and time is separately stored as a text file, the data is displayed on a screen as an image and is referenced with a application software on the host computer.

For the digital camera, a device has been proposed, in which time, comment sentences, or voice information is simultaneously recorded on an output image data for convenience of arranging the data. For example, in Japanese Patent Application Laid Open No. 58-53276, recitations for a technology to record voice information and time information on original image data as well as a technology to record information concerning image picking-up conditions on a file different from an original image data have been made. In Japanese Patent Application Laid Open No. 5-244482, recitations for a technology to enhance facilities for users by superimposing character information on a electronic view finder have been made.

In the conventional digital camera, in case where character information such as image picking-up conditions is superimposed on an initial image forming its compressed image or on an original image, it has been difficult to delete the character information in spite of wish to use the initial image as it is. Furthermore, in case where it is intended to store it as other image picking-up information file, it is necessary to seek a relationship between it and the initial image using some information. An operation for seeking the relationship is performed, for example, by giving the same file name to it as that of the initial image and by giving different accompanying characters to it from those of the initial image. However, in this case, when the number of pieces of the picked-up images increases, the contents of the image can not easily be discriminated only by the file name. Managements for them will be complicated.

Furthermore, when a plurality of images are simultaneously displayed on one screen using a application software on the host computer, a reduced image for use in simultaneous display on one screen (hereinafter, referred to as simultaneous display) is generated by reducing the original image at the time when the simultaneous display function is first selected. After that, the reduced image is used after storing it. No image for use in the simultaneous display is generated within the digital camera. Furthermore, a character synthesis processing is not conducted within the digital camera, and these processings are conducted by the host computer. Therefore, when the simultaneous display is conducted, the host computer is forced to perform excessive processing.

SUMMARY OF THE INVENTION

The object of the present invention is to provide a digital camera which is capable of storing parameters constituting character information such as date, time, and image picking-up conditions without giving influence to an initial image, and which is easy to effectively manage the initial image and image picking-up information even when the number of pieces of the initial images increases.

A digital camera of the present invention comprises an image picking-up section for picking-up an object to generate an initial image constituting an image on a frame memory; an image picking-up information generating section for outputting image picking-up information including at least one of date and time of image picking-up and image picking-up conditions as a text file; and a recording medium for recording said initial image. According to the present invention, a character image generation section for converting the image picking-up information to bit map character image data is further provided, and the bit map character image data is stored on said recording medium independently from said initial image.

In the digital camera of the present invention, it is possible to store bit map character image data in the recording medium as an independent single file. In this case, the constitution of the digital camera is simplified. The digital camera further comprises a reduction processing section for generating a reduced image; and a synthesis processing section for synthesizing an output of the character image generation section with the reduced image, and the bit map character image data and the reduced image are superimposed to store them in the recording medium. In this case, a digital camera application software of the host computer for performing reading-out of the image can be simplified.

According to the digital camera of the present invention, on the digital camera application software to be operated in the host computer, the bit map image data including the image picking-up information used in the image picking-up simultaneous display function is generated in the digital camera and is stored in the recording medium. For this reason, in the host computer, the bit map character image data including parameters constituting character information such as date and time of image picking-up and conditions of image picking-up can be quickly displayed. In the digital camera, since these parameters can be recorded without affecting the initial image, the initial image can be used as the original image.

Furthermore, if the digital camera of the present invention has a function to generate synthesis data by synthesizing the bit map character image data with the reduced image, the image picking-up information as well as rough contents of the initial image can be simultaneously referenced, and information of a plurality of images can be referenced at a time. Since the simultaneous display function of the application software is a existing technology which has been heretofore performed, this function can be realized on the host computer without special modification of the application software.

As described above, according to the digital camera of the present invention, the image picking-up information such as date and time of image picking-up and conditions of the image picking-up are stored independently from data of the initial image, whereby the initial image can be used as the original image. Furthermore, the effect that the image picking-up information can be quickly referenced using the simultaneous display function which has been heretofore included in the application software can be achieved.

BRIEF DESCRIPTION OF THE DRAWINGS

The above and other objects, features and advantages of the present invention will be become apparent from the following detailed description taken with the accompanying drawings in which.

DETAILED DESCRIPTION OF THE PREFERRED EMBODIMENTS

Figure 1:
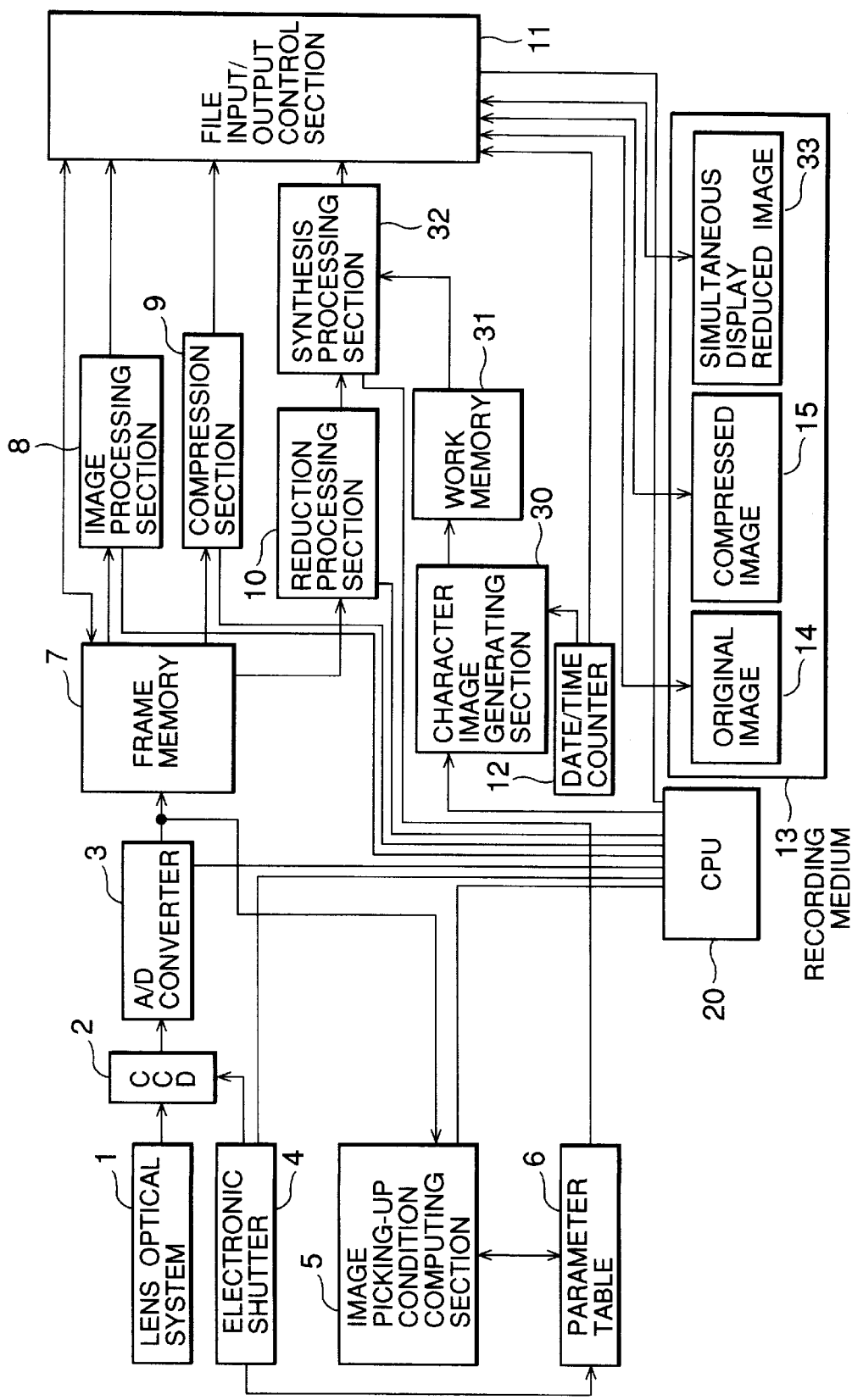
FIG. 1 is a block diagram of a digital camera of a first embodiment of the present invention.

Embodiments of the present invention will be described with reference to the accompanying drawings in detail, below. The same reference symbols are given to the same components in the drawings.

FIG. 1 is a block diagram showing a constitution of a digital camera of a first embodiment of the present invention. Referring to FIG. 1, the digital camera reads out an image by a CCD 2 and stores both of a picked-up image and bit map character data on a recording medium 13 in response to a command from a CPU 20. A lens optical system 1 forms an image of beam from an object on the CCD 2. An electronic shutter 4 generates trigger signals to fetch a picked-up image for one screen for a period of time corresponding to a designated shutter speed, when an operator pushes down a shutter button (not shown) on the camera. Thus, the CCD 2 outputs analog signals during the period of continuation of the trigger signals provided from the electronic shutter 4. An A/D converter 3 converts the analog signals from the CCD 2 to digital signals. A frame memory 7 stores a digital image converted for one screen by the A/D converter 3, and stores an image processed by an image processing section 8.

On the other hand, an image picking-up condition computing section 5 thins out the digital image supplied from the A/D converter 3 in response to the command from the CPU 20 and analyzes the contents of the thinned-out image, thereby computing the shutter speed and the optimum parameters at the time of the A/D conversion. The computing results of the image picking-up computing section 5 are temporarily stored in a parameter table 6 as text data. An image processing section 8 performs image processings such as hue adjustment, while balance and black balance for the input image. The image obtained through such image processing is written again to the frame memory 7, or this image is directly transmitted to a file input/output control section 11. A compression processing section 9 performs a compression processing for the image on the frame memory 7 in response to the command from CPU20 and transmits it to the file input/output control section 11. Moreover, a reduction processing section 10 performs a reduction processing for the image on the frame memory 7 in response to the command from the CPU 20. A character image generation section 30 converts the contents of the parameter table 6 in the form of text file and information concerning date and time from a date/time counter 12 to a character image and store it in a work memory 31. The information concerning date and time from the date/time counter 12 is generated by counting an oscillation output of a quartz oscillator. A synthesis processing section 32 synthesizes the character image on the work memory 31 with the reduced memory output from the reduction processing section 10.

The file input/output control section 11 performs controlling to write the image on the frame memory 7 as well as the image directly transmitted from the image processing section 8 to the recording medium 13. The file input/output control section 11 performs also a control to write the image obtained by compressing the image on the frame memory 7 to the recording medium 13. Moreover, the file input/output control section 11 controls to record the synthesized image from the synthesis processing section 32 on the recording medium 13, the synthesized image including information output from the date/time counter 12. The recording medium 13 can store the image data for a plurality of pieces.

Specifically, on the recording medium 13, a reduced image 33 for use in simultaneous display is recorded, which is obtained by superimposing an image obtained by reducing the original image 14 on the image picking-up information such as an exposure time, use of flash, contents of color conversion table, date and time of image picking-up using the synthesis processing section 32. An original image 14 which is not subjected to a data compression conversion by the compression processing section 9 and a compression image 15 which is an image obtained data compression conversion by the compression processing section 9 are also recorded on the recording medium 13.

Figure 2:
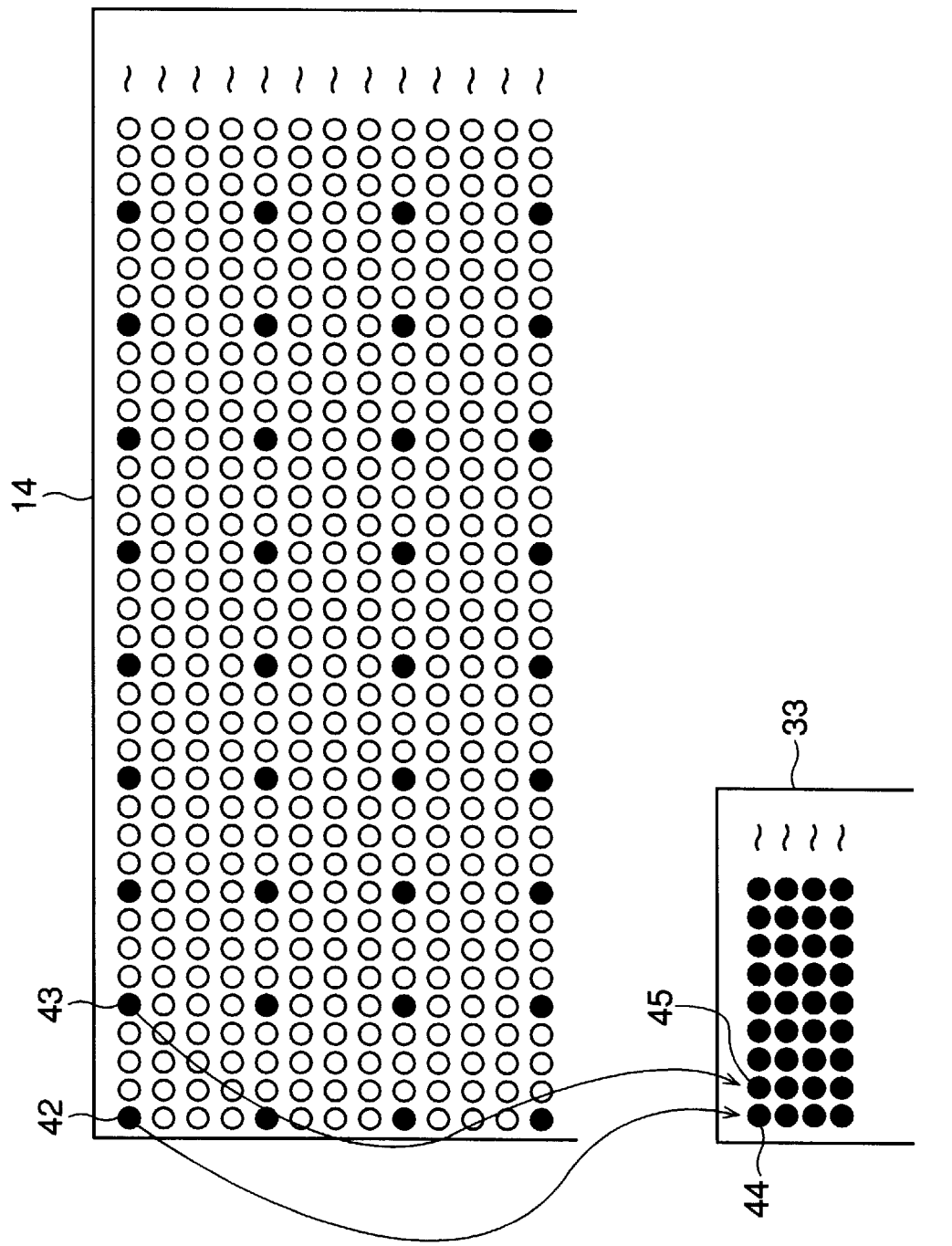
FIG. 2 is a schematic explanatory view of a display screen showing processing of a reduction processing section 10 in the digital camera of FIG. 1.

The reduction processing section 10 executes a reduction processing for the image on the frame memory 7 at the equal ratio in the horizontal and vertical directions. FIG. 2 is a schematic view of a pixel arrangement on the frame memory for explaining such situation. For example, when the image having a dimension of 480 in the vertical direction×640 in the horizontal direction is reduced in size, as shown in FIG. 2, pixels are sequentially sampled every four pixels beginning from a base point of coordinates (X, Y)=(0, 0). In this case, sampling is sequentially performed such that the pixel 42 (coordinates (0, 0)) on the original image 14 is changed to the pixel 44 (coordinates (0, 0)) on the simultaneous display reduced image 33 and the pixel 43 (coordinates (4, 0)) is changed to the pixel 45 (coordinates (1, 0)).

Figure 3:
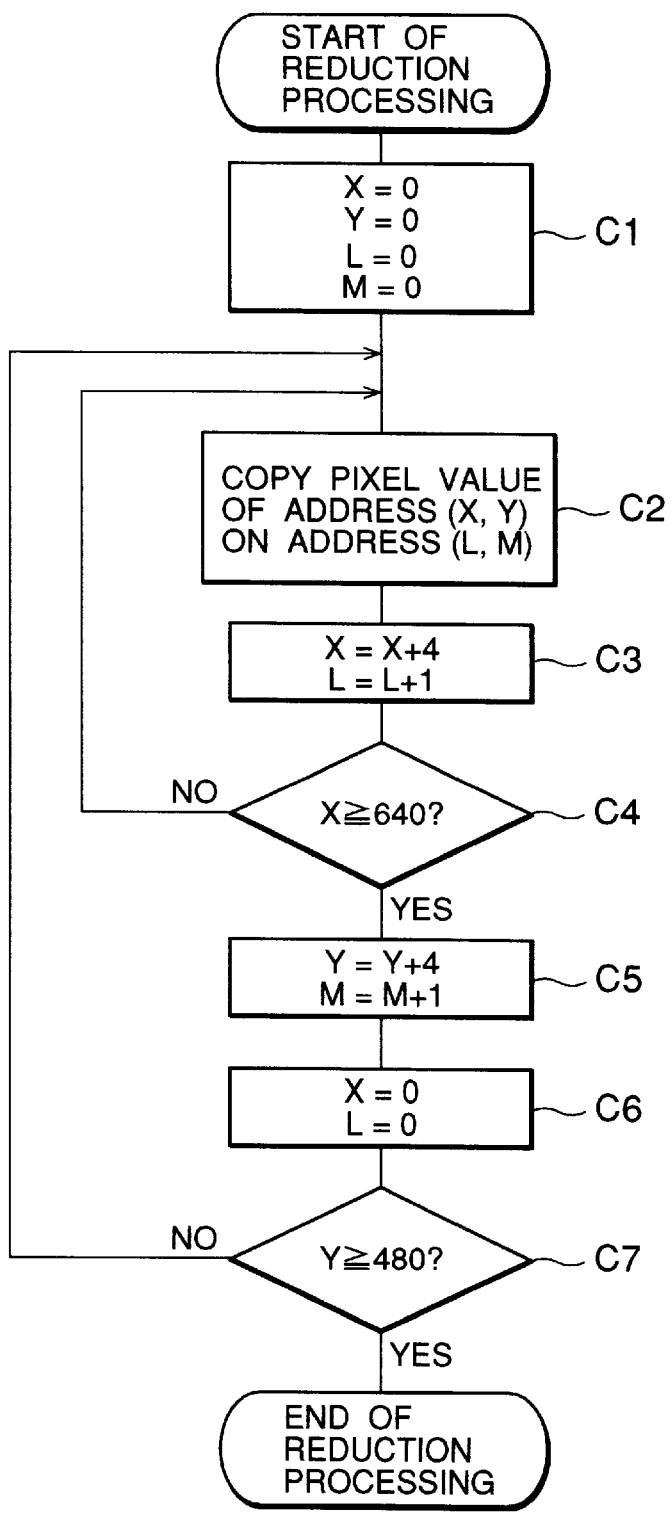
FIG. 3 is a flow chart showing the processing of the reduction processing section 10 of the digital camera of FIG. 1.

A flow chart of control algorithm for sampling is shown in FIG. 3. Referring to FIG. 3, first, initial values X=0, Y=0, L=0, and m=0 are set (step C(1)). The pixel at the position of the coordinates (X, Y) is sampled, and the value of this pixel is copied on the address of the coordinates (L, M) of the reduced image (step C2). The sampled image is temporarily stored in a buffer in the reduction processing section 10. Thereafter, an address of X is set to be X=X+4 and an address of L is set to be L=L+1, so that the address is up-dated (step C3). Subsequently, it is detected whether sampling in the main scanning direction has been completed by examining the values of X and Y (step C4). In case where sampling has not been completed, the foregoing processing are repeated. After sampling in the main scanning direction 1 line has been completed, addresses in a sub-scanning direction is set to be Y=Y+4 and M=M+1 so that the addresses are up-dated (step C5). Thus, the addresses of X and L are restored to 0 (step C6). Moreover, it is detected whether sampling has been completed in the sub-scanning direction by examining the value of Y (step C7). In a case where sampling has not been completed, the foregoing processing are repeated. When sampling in the sub-scanning direction is completed, the reduction processing is completed. By the foregoing processings, the originally image is reduced to the image having dots of 120 in a vertical direction×160 in a horizontal direction.

The character image generation section 30 stores dot character data of, for example, 16×16 dot size therein. The work memory 31 is cleared by 0 value upon starting of the CPU 20. Subsequently, the contents of the parameter table 6, that is, the computing results of the image picking-up condition computing section 5 are read out. The contents of the parameter table 6 has been recorded in the determined address position of the memory according to hexadecimal number system. The character image generation section 30 reads-in the value of the contents of the parameter table 6 and performs data conversion from the hexadecimal number system to the decimal number system. Then, the character image generation section 30 converts the converted values to bit map character image of Roman numeral corresponding to the values. A bit map character image obtained by adding a predetermined front phrase for discriminating the data contents to the front of the bit map character images is generated. The front phrase is, for example, the characters composed of "exposure time". The character image is output to the work memory 31.

For example, the bit map character images such as "exposure time: $\frac{1}{100}$" and "flash:no" is formed on the work memory 31. These character images are drawn from a predetermined reference point on the work memory 31 designated by the CPU 20. The character image generation section 30 reads out information in the form of a text file concerning date and time from the date/time counter 12, and the information is converted to bit map character images accompanied with a front phrase, thereby generating a bit map character image. This bit map character image is also drawn in a position on the work memory 31 where it is not superimposed with already drawn bit map character images.

The work memory 31 is one which stores a bit map character image having the same size as that of the reduced image in vertical and horizontal directions and the depth for one bit.

The synthesis processing section 32 synthesizes the images on the work memory 31 on the reduced image to be input and outputs it. The synthesis processing section 32 selects a synthesis method according to the value "0" or "1" of pixels on the work memory 31. As an example, when the number of the pixel is "0", no special processing is performed, and the value of the pixel at the next address position on the work memory 31 is read out. When the value of the pixel is 1 (the pixel on which the bit map character image is drawn), one pixel on the same address position of the reduced image to be synthesized is read out from the reduction processing section 10. Since this read out pixel usually consists of R, G and B colors, each being 8-bits (256 gradations), the following detections are performed assuming that the threshold value for each color is 128.

Specifically, the synthesis processing section 32 first counts the number of the inequalities which satisfies the conditions among three inequalities R<128, G<128 and B<128. When all of the three inequalities satisfies the conditions, the judgment value shall be 3, and when all of them do not satisfy the conditions, the judgment value shall be 0. When the judgment value is either 0 or 1, the initial pixel is detected to be a light color (rather whitish color pixel). Thus, the character is written with values of R=0, G=0 and B=0 (black). When the judgment value is either 2 or 3, the initial pixel is detected to be a deep color (rather blackish color pixel). Thus, the character is written with values of R=255, G=255 and B=255 (white). Specifically, in display of the character, brightness different from that of the background is selected. If the character is synthesized by the above-described method, the characters can be easily distinctively discriminated from the background by the difference of the brightness, even when the characters are synthesized with a dark image such as a night view or a bright image such as a white wall.

Figure 4:
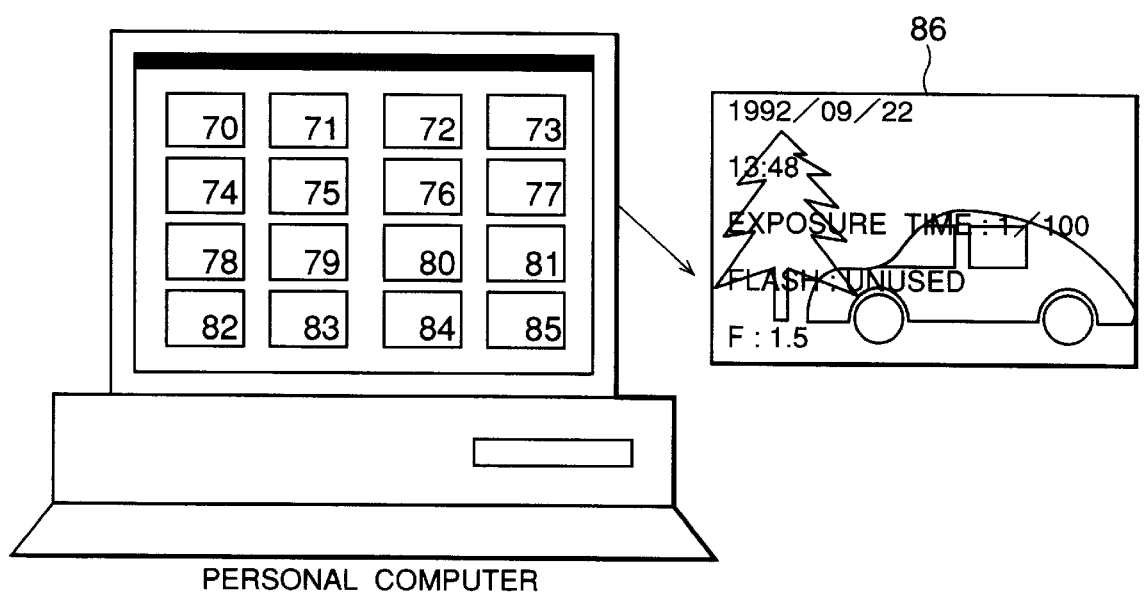
FIG. 4 is a schematic front view displaying a reduced image for a simultaneous display on a screen of a host computer, utilizing the digital camera of FIG. 1.

The simultaneous display reduction image 33 stored in the recording medium 13 is an image data obtained by synthesizing the character image on the reduced image, the character image being made in the form of bit map such as image picking-up conditions, image picking-up date and time which are output from the synthesis processing section 32. FIG. 4 is a front view schematically showing an example of the image data. In FIG. 4, the image 86 is an image in which data concerning image picking-up conditions and the like are superimposed thereon. It should be noted that in FIG. 4, for the convenience's sake, the colors of the characters is not shown such that they changes to white or black depending on the state of the background.

Next, an image processing operation of the digital camera of FIG. 1 after the image is stored in the frame memory 7 will be described. The image processing section 8 reads out the frame memory 7 and performs image processing in a similar manner performed by the conventional digital camera. When the picked-up image as the result of the image processing is stored in the frame memory 7 again, the CPU 20 enables the character image generating section 30 to operate. The character image generating section 30 forms, on the work memory 31, the character image obtained by converting the information such as image picking-up conditions and image picking-up date and time to the form of a bit map. When the formation of the character image is completed, the CPU 20 enables both of the reduction processing section 10 and the synthesis processing section 32 to operate. The reduction processing section 10 reads out the original image before being compressed on the frame memory 7, and reduces it to the image having the same size as that of the work memory 31. The reduced image as the result of the reduction processing by the reduction processing section 10 is transmitted to the synthesis processing section 32. The synthesis processing section 10 synthesizes the input reduced image with the image on the work memory 31, and transmits the reduced image after synthesizing processing to the file input/output control section 11. The reduced image transmitted to the file input/output control section 11 is recorded in the recording medium 13, and it becomes the simultaneous display reduced image 33.

The simultaneous display reduced image 33 is read out by a simultaneous display function of the application software of the digital camera executed on the personal computer, and the simultaneous display reduced image 33 is used for simultaneous displaying on the display screen of the personal computer as the displays 70 through 85 sequentially arranged in vertical and horizontal directions on the display screen of FIG. 4. With such displaying by arranging the simultaneous display reduced image 33, the contents of the image and the information at the time of image picking-up can be simultaneously observed. Since the simultaneous display reduced image 33 is inherently used for retrieval, even when the quality of the image is somewhat degraded due to the character synthesis, the purpose can be achieved, as long as rough outline of the image can be recognized.

In the application soft ware for the digital camera, the simultaneous display function is usually supported by standards, it is called a browser function and the like. Moreover, the simultaneous display reduced image 33 is called a thumbnail image. In the conventional camera application, when the simultaneous display function is first selected, the original image is reduced to generate the reduced image for simultaneous displaying. Thereafter, the reduced image is stored and used. In the present invention, since the simultaneous display image is generated within the digital camera, the simultaneous display can be performed at a high speed. Moreover, since the character synthesis processing is conducted within the digital camera, there is no necessity for the host computer to execute excessive processings. Moreover, in this system adopted in the present invention, since the characters are not synthesized with the original image 14 and the compressed image 15, the initial images can be used as these images.

Figure 5:
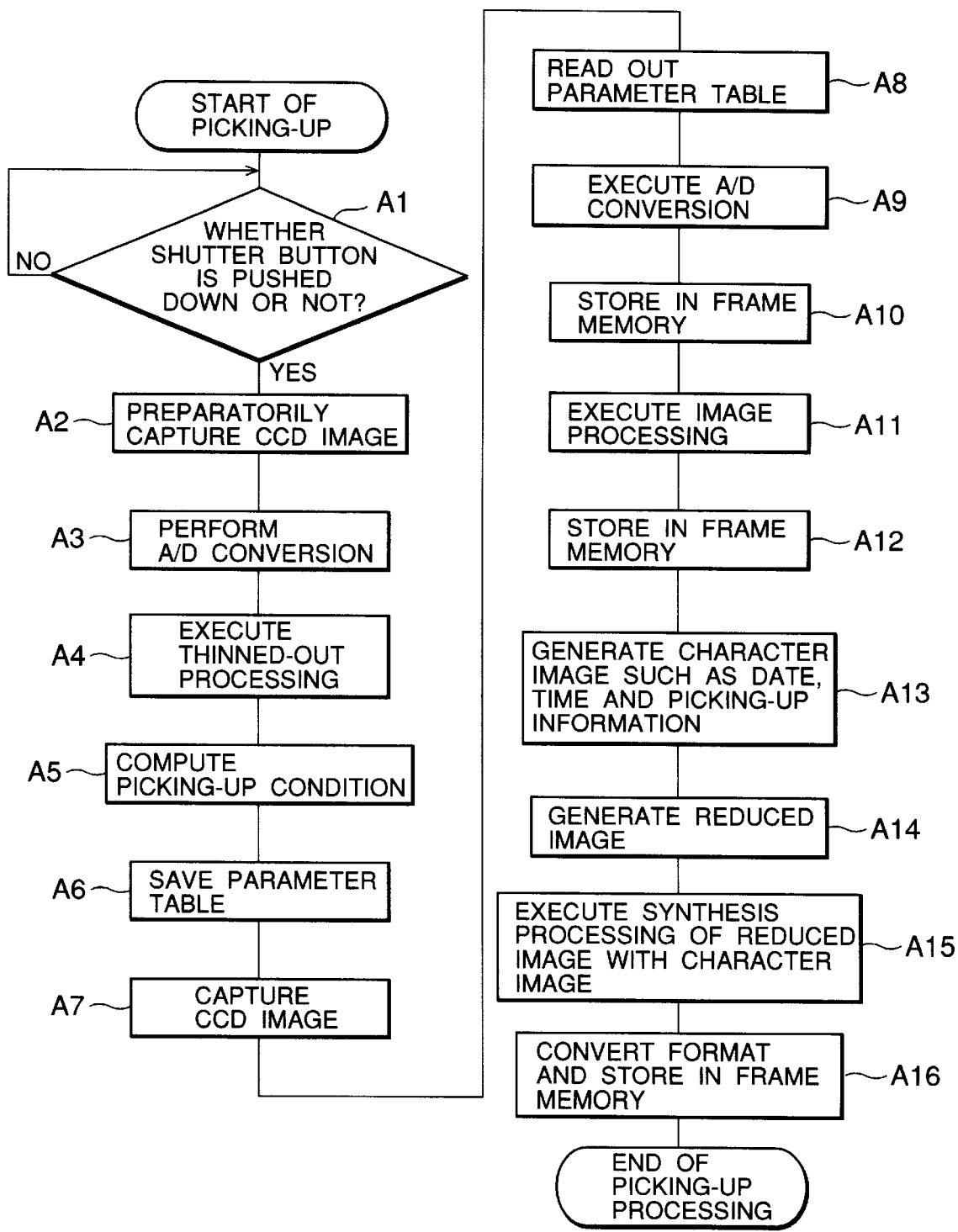
FIG. 5 is a flow chart showing processing of the digital camera of FIG. 1.

FIG. 5 is a flow chart showing processings in the digital camera of the foregoing embodiment. In this digital camera, the internal electronic shutter 4 remains in a wait state until the shutter is pushed down. The image picking-up signal is first informed to the CPU 20 when the shutter is pushed down (step A1). The CPU 20 issues the command to the electronic shutter 4 so that the analog image on the CCD 2 is preparatorily captured at an inherent shutter speed (step A2). The electronic shutter 4 controls the CCD 2 so that the CCD 2 transmits the analog data to the A/D converter 3 for a period of time corresponding to the inherent shutter speed. The A/D converter 3 converts the analog image supplied thereto to the digital image (step A3). At this time, no digital image is stored in the frame memory 7.

On the other hand, the digital image from the A/D converter 3 at the time of preparatory capturing is transmitted to the image picking-up computing section 5, and the transmitted digital image is subjected to a thinned-out processing to a degree in the image picking-up condition computing section 5 such that a rough outline of the image can be recognized (step A4). This thinned-out processing is carried out to compute the image parameters at a high speed. The contents of the thinned-out image obtained by the thinned-out processing, for example, frequency distribution histogram for each value of the pixels and component ratio of the colors, are analyzed and, as a result, the image picking-up conditions such as the optimum exposure time, color conversion matrix, white balance conversion parameters, black balance conversion parameters, are computed (step A5). For example, when many pixels of white color exist in the preparatorily captured image, the image is judged to be bright so that the shutter speed is determined to be shorter than the initial value. The parameter group computed in the image picking-up condition computing section 5 is stored in the parameter table 6 (step A6).

The CPU 20 outputs the capturing command again to the A/D converter 3 at the time when the information is set at the parameter table 6 (step A7). Capturization of the image at this time is carried out by reading out the image picking-up conditions recorded in the parameter table 6 (step A8). The electronic shutter 4 controls the CCD 2 such that the CCD 2 transmits the analog signal to the A/D converter 3 for a period of time corresponding to the shutter speed written to the parameter table. The transmitted analog image is converted to the digital image by the A/D converter 3 (step A9). The original data obtained by conversion of the A/D converter 3 is once output to the frame memory 7 under the state that the original data is not subjected to image processing (step A10).

The CPU 20 issues the command for image processing execution to the image processing section 8 at the time when the digitized original data image converted for one screen is output to the frame memory 7. The image processing section 8 executes various kinds of image processing composing after steps for the original data image on the frame memory 7 (step A11). The image processing parameter at the time of the image processing is executed with reference to the parameter table 6 determined by the preparatory captured image, and the image as the result of the image processing is once written back to the frame memory 7 (step A12).

The CPU 20 enables the character image generation section 30 to operate at the time when the image having been subjected to the image processing is stored in the frame memory 7. The character image generating section 30 which has already started an operation receives the information from the date/time counter 12, and, at the same time, receives the image picking-up information from the parameter table 6, thereby forming the bit map character image data on the work memory 31 (step A13). Next, since the CPU 20 applies triggers to the reduction processing section 10 and the synthesis processing section 32, the reduction processing section 10 reduces the image in the work memory 7 to the same size as that of the work memory 7 (step A14).

The reduced image is directly output to the synthesis processing section 32, and the reduced image is synthesized with the bit map character image in the work memory 31 (step A15). The synthesized image is directly sent to the file input/output control section 11, and it is output as the simultaneous display reduced image 33 in the recording medium 13 (step A16). Subsequently, the image on the frame memory 7 is directly output to the recording medium depending on the presence of the compression instructed by an operator panel (not shown), or the image on the frame memory 7 is output after compression is output to the recording medium 13 (step A16).

Figure 6:
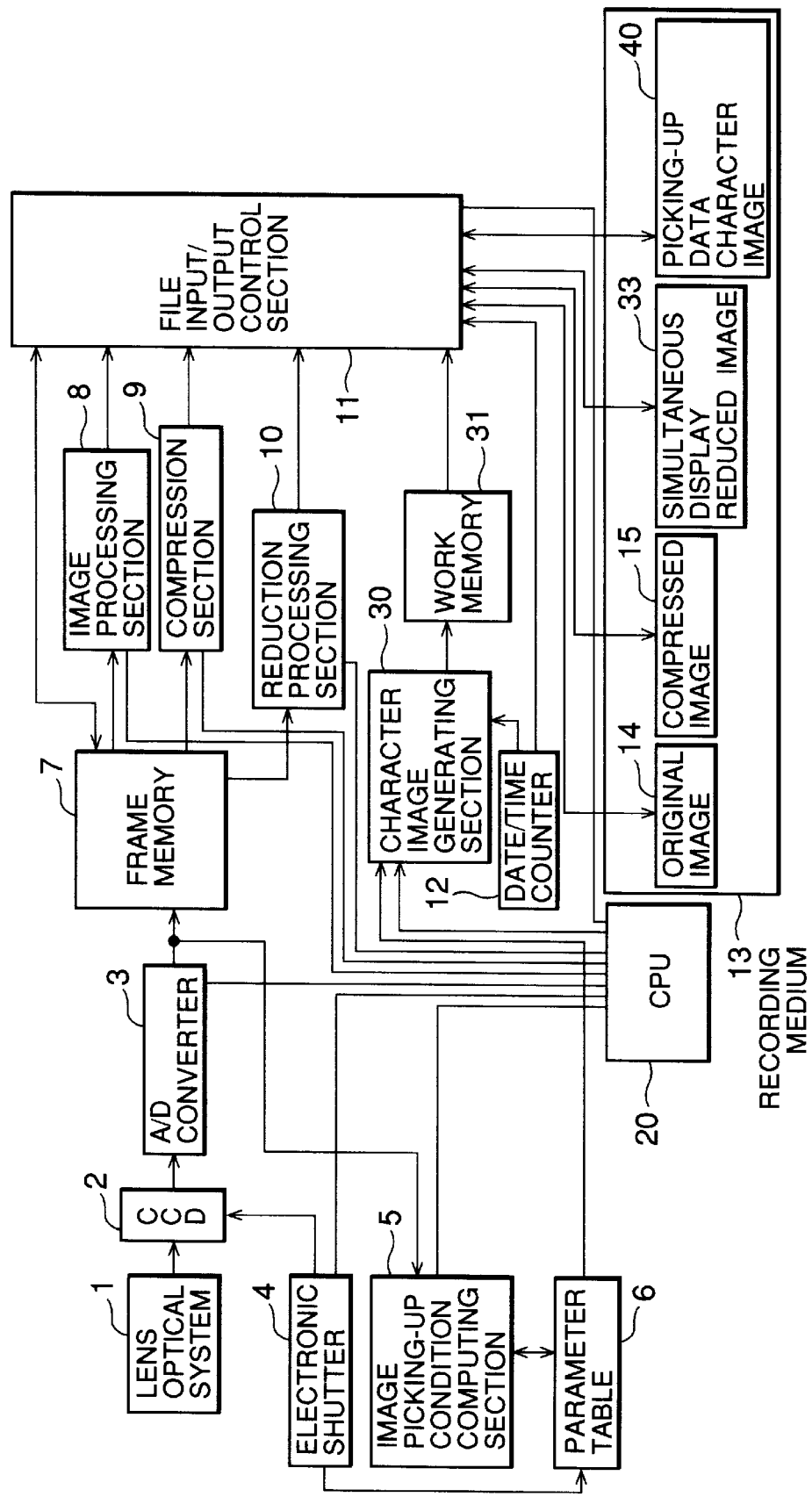
FIG. 6 is a block diagram showing a digital camera of a second embodiment of the present invention.

FIG. 6 is a digital camera of a second embodiment of the present invention. The digital camera of this embodiment differs from that of the first embodiment in that the synthesis processing section 32 is omitted in this embodiment. The character image generation section 30 initializes the work memory 31 at a value of 0. Thereafter, the character image generating section 30 generates the bit map character image showing the contents of the parameter table 6 and the information of the date/time counter 12. Moreover, the character image generating section 30 directly transmits the image picking-up data character image to the file input/output control section 11 at the time when it is generated on the work memory 31. The file input/output control section 11 outputs onto the recording medium 13 as a single image picking-up data character image 40.

Therefore, two kinds of reduced size image are stored on the recording medium 13, and the information concerning date and time is not superimposed on the simultaneous display reduced image 33. As described above, in the present invention, the bit map character image data is stored on the recording medium 13 as a independent file. Although also in the conventional digital camera, there is an example in which the image picking-up information is stored independently, the information to be recorded in the form of character code in case of the conventional digital camera. Moreover, even when it is dealt as the bit map character image data, the image picking-up information data is synthesized on the compressed image data.

Moreover, in this embodiment, character image converted into the bit map image having the size as that of the reduced imate is stored separately from the reduced image. Thus, the constitution of the digital camera itself can be simplified compared to that of the foregoing a embodiment. In this case, in the application software, by simply adding a simple image synthesis function performed by the foregoing synthesis processing section 32, the simultaneous display reduced image 33 onto which the image picking-up information is superimposed can be generated.

Figure 7:
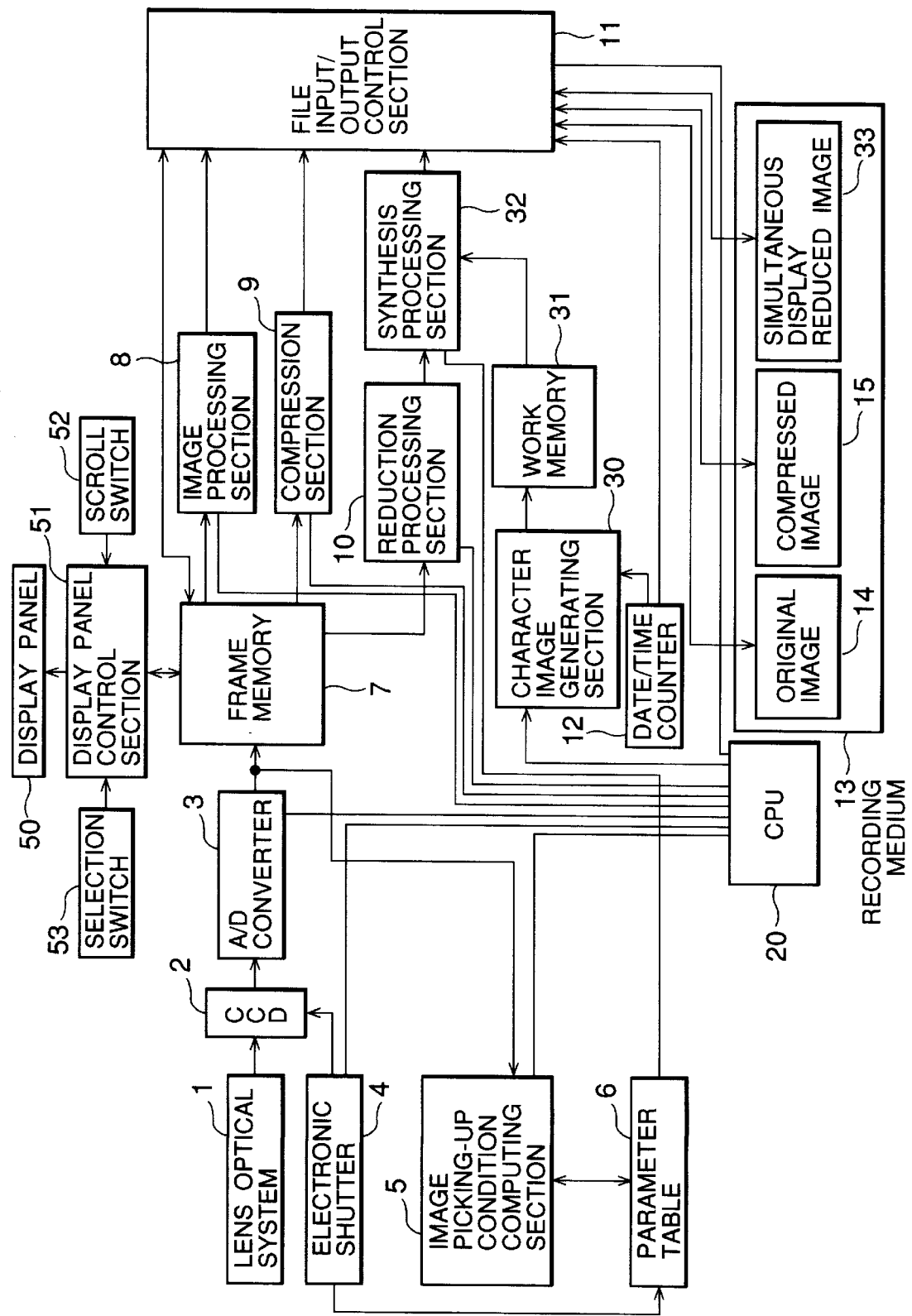
FIG. 7 is a block diagram showing a digital camera of a third embodiment of the present invention.

FIG. 7 shows a digital camera of a third embodiment. The digital camera of this embodiment differs from that of the first embodiment in that the digital camera of this embodiment has a function able to read the stored image.

There are provided with a display panel 50, a display panel control section 51, a scroll switch 52, and a selection switch 53 in the digital camera of this embodiment, and a plurality of image can be displayed while arranging an image picking-up condition writing reduced image.

The display panel 50 is a display device formed of an LCD and the like. The display panel control section 51 performs controlling of the display panel 50. The scroll switch 52 serves as a switch for an operator to sequentially scroll the reduced images displayed on the display panel 50. The selection switch 53 serves as a switch to display an original image corresponding to the reduced image on the display panel 50 after reading out the original image from the recording medium 13 by pushing the selection switch 53 by the operator, when the operator observes the original image by moving a cursor on the position where the reduced image is displayed.

When the operator makes an instruction for the display of the reduced image, the file input/output control section 11 reads-in the reduced images from the recording medium 13, in a predetermined order such as an order of image picking-out dates and an order of file names, and a plurality of reduced images are arranged on the frame memory 7, whereby large image data is formed like that of FIG. 4. The display panel control section 51 permits the display panel 50 to display the formed image thereon. When the operator operates the scroll switch 52, the file input/output control section 11 reads-in the reduced image from the recording medium 13 and moves the arrangement positions of the stored images onto the frame memory 7. Thus, the reduced image displayed on the display panel 50 are sequentially scrolled. Moreover, when the operator observes the original image corresponding to the selected reduced image, the cursor is moved by the scroll switch 52 to the position where the reduced image to be selected is displayed and the selection switch 53 is pushed, whereby the original image 14 recorded in the recording medium 13 is read-in and the original image 14 is displayed on the display panel 50.

According to this embodiment, the image picking-up conditions under which the images are picked up and the images are displayed on the display panel, and they are used for the reference to set the image picking-up conditions.

Figure 8:
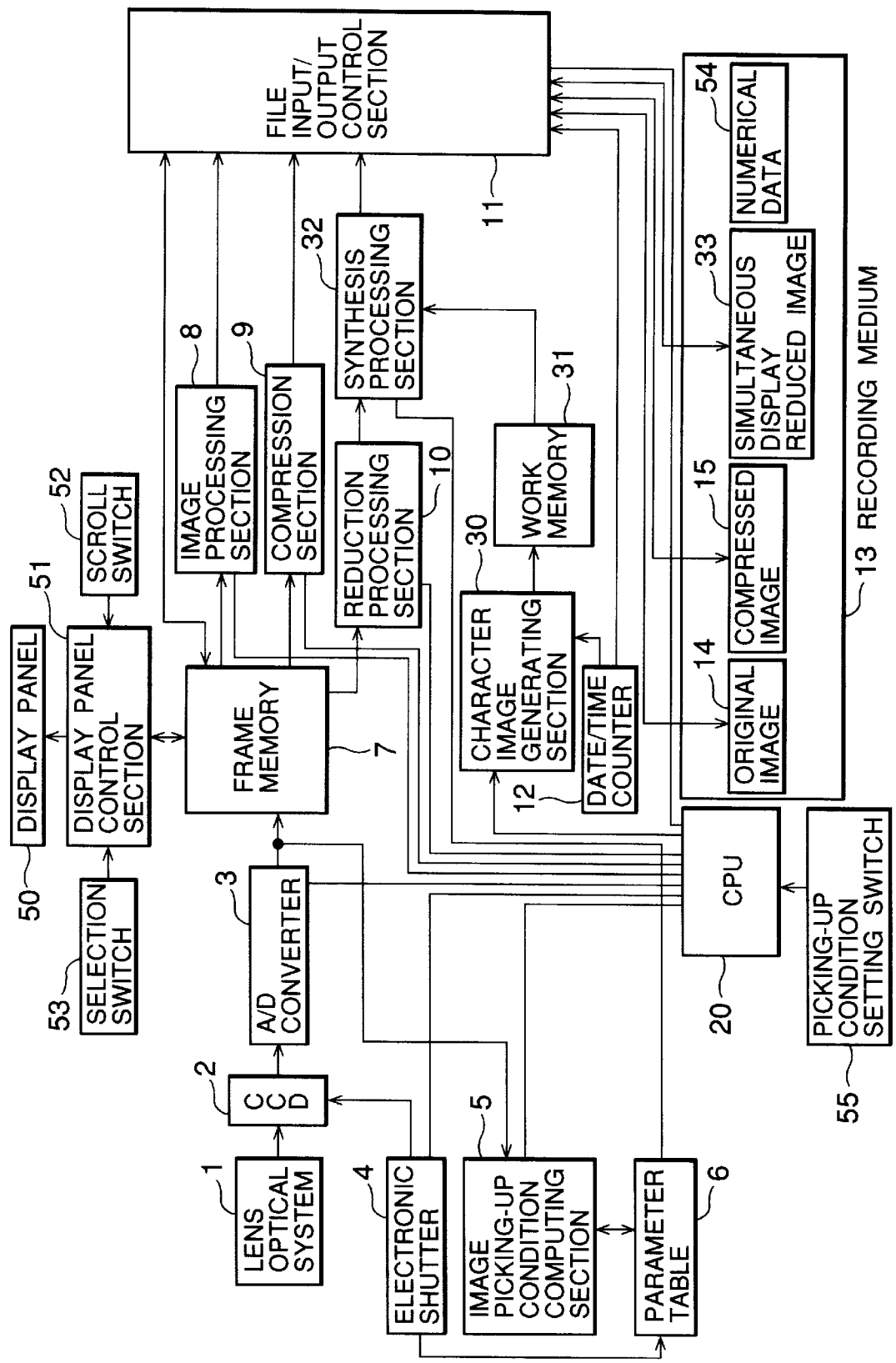
FIG. 8 is a block diagram showing a digital camera of a fourth embodiment of the present invention.

FIG. 8 is a digital camera of a fourth embodiment of the present invention. The digital camera of this embodiment differs from the digital camera of the third embodiment in that the simultaneous display reduced image is formed and, at the same time, the numerical data 54 for the image picking-up conditions is recorded on the recording medium 13. Moreover, there is provided with a image picking-up condition setting switch 55.

The image picking-up setting switch 55 is a switch which is used to set the digital camera to the same image picking-up conditions displayed on the reduced image to which the cursor is moved, after the operator sequentially scrolls the reduced images displayed on the display panel 50.

When it is stored in the recording medium in which the simultaneous display reduced image 33 is formed, the CPU 20 generates the numerical data 54 to hold the contents of the parameter table 6 and the information concerning the date/time counter 12 as the numerical data and stores them on the recording medium 13.

Therefore, the simultaneous display reduced image 33 and the numerical data 54 are stored on the recording medium 13.

When the operator operates the scroll switch 52 according to the same manipulations as those of the third embodiment, the position where the reduced image formed on the frame memory 7 is arranged moves. Consequently, the reduced images displayed on the display panel 50 are sequentially scrolled. When the operator sets the digital camera to the same image picking-up conditions displayed in the selected reduced image, using the scroll switch 52, the operator matches the reduced image of the selected image to the position where the cursor is displayed and then pushes the image picking-up condition setting switch 55, the numerical data 54 corresponding to the selected reduced image is read in. The CPU 20 recognizes the contents thereof, and performs setting for predetermined values of the image picking-up conditions of, for example, the electronic shutter and the A/D converter.

According to this embodiment of the present invention, in case where image picking-up is performed under the same conditions as the setting conditions which was set for the digital camera used in the former image picking-up, there is no necessity to set the same conditions by inputting them again. Therefore, the image picking-up is performed under the same setting conditions, the operations will be simple. Moreover, in this embodiment, when the simultaneous display is performed in the application software, with reference to the contents of the numerical data 54, the classified displaying is performed according to the predetermined items concerning the image picking-up conditions, for example, use of the flash, or sorting for the predetermined items of the image picking-up conditions is automatically carried out. For example, according to the values of shutter speeds, the arrangement of the reduced images displayed simultaneously can be easily observed by arranging them in the order of the shutter speeds according to the values of the shutter speeds.

In the foregoing description, the digital camera using the CCD device as the image picking-up device is used as an example of the present invention. The present invention is not limited to such type of the digital camera. The same effects as those of the foregoing embodiments can be obtained when image picking-up devices formed of various kinds of analog signal output devices are used. Moreover, as the reduction way for reducing the original image 14 by the reduction processing section 10, the reduction of the original image 14 by simply thinning-out the pixels every four pixels was described. Thinning-out way is not limited to this way. Moreover, as the way to synthesizing the character image by the synthesis processing section 32, the way in which the value written is selected depending on whether the value of the pixel of RGB colors is larger than 128. However, the synthesis way is not limited to this, and other synthesis ways can be adopted.

The present invention was described based on the preferred embodiments. The digital camera of the present invention is not limited only to the constitutions of the foregoing embodiments. Digital cameras which are obtained by remodeling and modifying the constitutions of the digital cameras of the foregoing embodiments may be in the scope of the present invention.

What is claimed is:

1. A digital camera comprising:
   image picking-up means for generating an initial image by picking-up an object;
   image picking-up information generating means for outputting image picking-up information as text file data, said image picking-up information including at least one of picking-up date, picking-up time and picking-up condition;
   character image generating means for converting the text data of said image picking-up information to a bit map character image;
   reduction processing means for generating a reduced image by reducing said image in image size;
   synthesis processing means for generating a simultaneous display reduced image by synthesizing said bit map character image with said reduced image;
   a recording medium for storing an image; and
   control means for recording said simultaneously display reduced image on said recording medium.

2. The digital camera as set forth in claim 1, wherein said character image processing means generates said bit map character image having a size equivalent to that of said reduced image.

3. The digital camera as set forth in claim 2, wherein said control means stores said bit map character image and said reduced image as files, each being independent from each other.

4. The digital camera as set forth in claim 1, wherein said synthesis processing means reads out one pixel of said reduced image located in the same position as that of a pixel having a pixel value of 1 on said bit map character image, compares data of red, green and blue colors in one pixel of said reduced image with a previously set threshold value, when the number of the colors more than the threshold value is two or more, the image synthesis is performed while regarding the pixel as white, and when the number of the colors more than the threshold value is less than two, the image synthesis is performed while regarding the pixel as black.

5. The digital camera as set forth in claim 1, further comprising a display panel for displaying an image,
   wherein said control means searches said simultaneous display reduced image stored on said recording medium, and reads out more than one simultaneous display reduced image, when more than one simultaneous display reduced image is stored on said recording medium, said control means displaying more than one read out simultaneous display reduced image on said display panel while arranging them.

6. The digital camera as set forth in claim 5, further comprising selection means for selecting one of said simultaneous display reduced images displayed on said display panel.
   wherein said control means reads out an initial image corresponding to the selected simultaneous display reduced image, and displays the initial image on said display panel.

7. The digital camera as set forth in claim 5, wherein said control means searches an image picking-up condition numerical data stored in said recording medium, searches a reduced image corresponding to said image picking-up condition numerical data when the image picking-up condition numerical data is stored, and reads out a pair of said reduced image and said image picking-up condition numerical data when said reduced image is stored, thereby arranging a plurality of said reduced images in the order depending on a predetermined image picking-up condition value of said image picking-up condition numerical data to display them on said display panel.

8. The digital camera as set forth in claim 5, further comprising selection means for selecting one of said simultaneous display reduced images displayed on said display panel,
   wherein image picking-up condition numerical data corresponding to the selected simultaneous display reduced image is read out from the recording medium and the same image picking-up condition concerning a predetermined image picking-up value of the read-out image picking-up condition numerical data is set.

9. An image picking-up condition recording method comprising the steps of:
   picking-up an object to generate an initial image constituting an image;
   outputting image picking-up information including at least one of image picking-up date, image picking-up time and image picking-up condition as a text file;
   converting the image picking-up information output as said text file to a bit map character image;
   generating a reduced image by reducing said initial image in image size;
   generating a simultaneous display reduced image by synthesizing said bit map character image with said reduced image; and
   individually recording said simultaneously display reduced image onto a recording medium.

10. The image picking-up condition recording method as set forth in claim 9,
   wherein in said converting step, said image picking-up information is converted to a bit map character image having a size corresponding to that of said reduced image.

11. The image picking-up condition recording method as set forth in claim 10, further comprising a step for superimposing said bit map character image and said reduced image on one another,
   wherein said superimposing step comprising the step of:
      reading out one pixel of said reduced image from said recording medium, said one pixel being disposed at the same address position as that of a pixel having a pixel value of 1 on said bit map character image,
      comparing data of each of red, green and black colors of one pixel of said reduced image with a predetermined threshold value, and
      writing the pixel as white color when the number of the colors more than the threshold value is more than two and writing the pixel as black color when the number of the colors more than the threshold value is two or less.

* * * * *